(12) United States Patent
Gyland (10) Patent No.: US 11,084,389 B2
(45) Date of Patent: Aug. 10, 2021

(54) CABLE REEL ASSEMBLY

(71) Applicant: Geir Olav Gyland, Kristiansand (NO)

(72) Inventor: Geir Olav Gyland, Kristiansand (NO)

( * ) Notice: Subject to any disclaimer, the term of this patent is extended or adjusted under 35 U.S.C. 154(b) by 0 days.

(21) Appl. No.: 16/641,593

(22) PCT Filed: Aug. 21, 2018

(86) PCT No.: PCT/EP2018/072526
§ 371 (c)(1),
(2) Date: Feb. 24, 2020

(87) PCT Pub. No.: WO2019/038265
PCT Pub. Date: Feb. 28, 2019

(65) Prior Publication Data
US 2020/0198479 A1 Jun. 25, 2020

(30) Foreign Application Priority Data
Aug. 24, 2017 (NO) .................................. 20171388

(51) Int. Cl.
*B60L 53/12* (2019.01)
*B65H 75/42* (2006.01)
(Continued)

(52) U.S. Cl.
CPC .............. *B60L 53/12* (2019.02); *B60L 50/66* (2019.02); *B60L 53/18* (2019.02); *B65H 75/425* (2013.01);
(Continued)

(58) Field of Classification Search
CPC .......... B60L 53/12; B60L 50/66; B60L 53/18; B60L 2200/12; H02J 50/80; H02J 50/12; B65H 75/425; B65H 75/42
See application file for complete search history.

(56) References Cited

U.S. PATENT DOCUMENTS 5,323,099 A 6/1994 Bruni et al.
5,461,299 A 10/1995 Bruni
(Continued)

FOREIGN PATENT DOCUMENTS

CN 201332253 Y 10/2009
CN 102632952 A 8/2012
(Continued)

OTHER PUBLICATIONS

International Search Report for corresponding International Application No. PCT/EP2018/072526, dated Nov. 29, 2018 (6 pages).
(Continued)

*Primary Examiner* — Robert L Deberadinis
(74) *Attorney, Agent, or Firm* — Osha Bergman Watanabe & Burton LLP (57) ABSTRACT

The invention concerns a cable reel assembly for inductive transfer of energy to an electrical device. The cable reel assembly comprises—a cable reel having an outer surface provided for the storage of a power cable, the cable reel is configured for accommodation of a primary side module comprising a primary coil provided for connection to the power cable, a secondary side module comprising a secondary coil provided for connection to the electrical device, control and communication means for communication between the primary side module and secondary side module and controlling the transfer of energy, the primary and secondary coil are arranged in an operative position to form an inductive coupling for transfer of energy from the primary coil to the secondary coil. The invention also concerns an electrical bicycle, an electrical tool and battery packet cable reel assembly comprising the cable reel assembly.

11 Claims, 6 Drawing Sheets

(51) Int. Cl.
  *H02J 50/80* (2016.01)
  *H02J 50/12* (2016.01)
  *B60L 50/60* (2019.01)
  *B60L 53/18* (2019.01)

(52) U.S. Cl.
  CPC .............. *H02J 50/12* (2016.02); *H02J 50/80* (2016.02); *B60L 2200/12* (2013.01)

(56) References Cited

U.S. PATENT DOCUMENTS

| | | | |
|---|---|---|---|
| 5,855,262 | A | 1/1999 | Jackson |
| 6,184,651 | B1 | 2/2001 | Fernandez et al. |
| 6,520,444 | B1 | 2/2003 | Muller |
| 9,610,996 | B2 | 4/2017 | Neugebauer et al. |
| 9,663,177 | B2 | 5/2017 | Craven et al. |
| 2012/0293007 | A1* | 11/2012 | Byun ................. H02J 5/005 307/104 |
| 2014/0062698 | A1* | 3/2014 | Fawcett ............. A47F 5/0861 340/568.3 |
| 2014/0117929 | A1 | 5/2014 | Lang |
| 2015/0015180 | A1 | 1/2015 | Miller et al. |
| 2016/0094080 | A1 | 3/2016 | Dong |
| 2016/0380395 | A1 | 12/2016 | Lee |
| 2017/0063142 | A1 | 3/2017 | Loewen |
| 2017/0368943 | A1* | 12/2017 | Von Novak, III ....... B62M 6/90 |
| 2019/0006833 | A1* | 1/2019 | Hall ...................... G05B 15/02 |

FOREIGN PATENT DOCUMENTS

| | | |
|---|---|---|
| CN | 203339751 U | 12/2013 |
| CN | 106711492 A | 5/2017 |
| DE | 20 2013 101 199 U1 | 4/2013 |
| DE | 10 2013 014 029 B3 | 1/2015 |
| JP | H11-187583 A | 7/1999 |
| JP | 2010-272412 A | 12/2010 |
| WO | 2010/131983 A1 | 11/2010 |

OTHER PUBLICATIONS

Written Opinion for corresponding International Application No. PCT/EP2018/072526, dated Nov. 29, 2018 (9 pages).

Norwegian Search Report for corresponding Application No. 20171388, dated May 3, 2018 (2 pages).

* cited by examiner

CABLE REEL ASSEMBLY

The present invention relates to the field of wireless power transmission using inductive principles for transfer energy to an electrical device.

The term electrical device as used herein include various drivable apparatuses, vehicles or chargeable devices for instance a battery. The chargeable device may be included in a vehicle or a drivable apparatus or may be arranged separate from these during the inductive energy transfer.

The invention may be employed for the driving and/or charging of battery operated apparatus such as vehicles for instance electric bicycles, golf cars and other utility and recreational vehicles. The invention may also be employed for inductive charging of various tools such as battery-operated craft tools and utility tools for instance garden and kitchen tools.

More specifically, the invention relates to a cable drum or cable reel assembly without slip rings where the power transfer or battery charging operation utilizes the principle of inductive energy transfer.

The cable reel assembly may be used in applications for driving an electrical apparatus which have no chargeable device present, but where the supply of voltage is needed for the driving of the apparatus. This use also includes the direct driving of electrically operated equipment such as a work lights or other equipment where a power cable is wound up on a cable reel assembly for plug in. The equipment may be suitable for use in especially harsh environment for instance a building site, on board a vessel or other demanding industrial environments.

BACKGROUND

Battery operated vehicles such as electric bicycles, golf cars and battery-operated tools are based on charging systems where the required energy is provided from the AC mains supply (conventional 230V or 110V grid). A charging device is needed to convert the AC mains to the current and voltage that is required for charging batteries.

Conventional charging devices are usually arranged with a cable having a cable connector to AC mains supply and to the electrical driven apparatus such as electric bicycles or tools, and a power converter/adapter for converting the grid voltage to the charging voltage for providing recharging energy or driving energy to the apparatus.

Establishing electrical connections both on the tool/vehicle side and the AC mains supply side usually involves fairly cumbersome installations steps. The presence of several electric contact points make the system vulnerable for possible contamination and exposure to moisture from wet environments which again may lead to contact faults and in worst case severe damages.

The handling of the cable may be troublesome and especially so if the cable has a substantial length. The disadvantage of a loose cable length is especially pronounced during transport. Both for battery operated bicycles and tools, the charging device will need to be brought along from time to time, and packaging of the loose cable takes up a considerable amount of space which is a disadvantage, at least when riding a bicycle and space is not in excess.

Based on these disadvantages with the problems of existing charging devices the need for improvement has risen as a current topic that would be advantageous to address.

In accordance with prior art several attempts have been made to provide a sufficient solution to these problems.

One approach includes employing inductive principles for charging batteries of electric bikes or tools. Prior art documents DE102013014029, US20140117929 and WO2010131983 disclose inductive charging of battery operated bicycles either when installed at a bike rack or by the use of a separate charging device.

The need for storing the cable for charging the bicycle have evoked several attempts to provide solutions that either store the cable in a part of the bicycle frame or by using an ordinary reel for the spooling of cable. The following prior art documents disclose examples of such solutions; CN203339751, U.S. Pat. No. 9,663,177, CN201332253 CN102632952, U.S. 62/960,728, U.S. Pat No. 9,610,996.

An obvious drawback of the solutions as presented in the cited publications is that one device or solution each is required for meeting each need; a drum for cable handling is provided and separate from this a solution for inductive charging of the bicycles battery.

When limited space is a rule, this is evidently a disadvantageous situation. The prior art solutions are silent about the possibility of bringing a cable along for conducting the charging by the use of inductive principles. A further drawback of these prior art solutions is that the inductive transfer of energy is to occur when the bicycle is installed in a bike rack, and as such these solutions disclose a permanent arrangement where the charging is to occur at predetermined locations.

Further the solutions as presented in the prior art documents are specified for implementation on an electrical bicycle, and do not mention the possibility of generalized use of these solutions other than for use in this application only.

An object of the present invention is to provide a compact and an autonomous solution that is versatile for independent use in various applications where charging of batteries or provision of energy for a driving operation is needed. These applications may include driving or charging of electric bicycles and tools, but may also be applicable for other apparatuses especially portable ones where the compact and simple entity may provide an easy to install solution for charging or driving operations.

A further object is to provide a solution that is suitable for portable use and in addition introduces flexible options when choosing the location for charging, and as such is independent of pre-installed inductive charging points.

A further object of the invention is to provide a solution that include technical features for providing necessary operations into a single unit, thereby reducing the need for multiple apparatuses for carrying out the various operations.

The invention is applicable both on existing apparatuses such as electrical bikes and tools but may of course also be part of the manufacturing process of these bikes and tools or other apparatus where the invention is applicable.

SUMMARY

The invention concerning a cable reel assembly for inductive transfer of energy has been set forth in the independent claim. Further additional features are set forth in the dependent claims.

On a general basis it should be noted that a typical wireless power transmission is based on the principle of magnetic resonance, or Inductive Power Transfer (IPT). This is the process of transferring an electrical current between two objects through the use of coils to induce an electromagnetic field. Inductive power transfer using the principle of resonance enables more voltage to be transferred than other methods.

In accordance with the invention a cable reel assembly for inductive transfer of energy to a chargeable device comprises a cable reel having an outer surface provided for the storage of a power cable. The cable reel is configured for accommodation of a primary side module comprising a primary coil provided for connection to the power cable. The cable reel assembly further comprises a secondary side module comprising a secondary coil provided for connection to an electrical device. The electrical connection between the power cable and the primary coil and the secondary coil and the electrical device may be established in various ways known to the skilled person; using a direct electrical connection or interconnecting wiring of various sorts and outlay, and if needed including additional electrical equipment depending on the chosen application and according to the need of the specific installation. The transferred energy may be used for driving or charging the electrical device. As mentioned previously the term electrical device include various drivable apparatuses, vehicles or a chargeable device for instance a battery which may comprise a chargeable device for instance a battery. Further the cable reel assembly comprises control and communication means for communication between the primary and secondary module and controlling the transfer of energy. The primary and secondary coil are arranged in an operative position to form an inductive coupling for transfer of energy from the primary coil to the secondary coil (for instance to be employed in a charging operation.)

The control and communication means for communication between the primary and secondary module may comprise a primary control and processing unit and a secondary control and processing unit for controlling and regulation of the inductive energy transfer to occur between the primary coil and a secondary coil. This communication may occur as signals transmitted inductively between primary and secondary coil or alternatively by primary and secondary signal coils. The primary control and processing unit may control the operation of the charging process, such as the charging algorithm, monitoring and termination of the charging by use of the communication channel and the regulation of the wireless power transmission. The communication between the primary and secondary module may include communication of data.

In one embodiment the primary control and processing unit may be configured to regulate the inductive transfer of energy based on signals representing information about the status of the electrical device as transmitted in communication between the primary control and the secondary control and processing unit.

The communication between the primary control and the secondary control processing unit may comprise regulation of a charging operation.

The primary and secondary side module may comprise one or several sensors, for example for measuring current, voltage, polarity, temperature.

The control and communication means may comprise primary and secondary signal coils arranged in an operative position to form an inductive coupling for transfer of energy representing data signals between the primary and secondary signal coils. Alternatively, the transfer of signals may be conducted by means of the primary and secondary coils, in which case the control and communication means comprises the primary and secondary coils.

The control and communication means may comprise modulator means for modulating the signal to be transferred, and where the signal transferred over the inductive coupling between the primary and secondary signal coils is modulated with a higher frequency than the energy transferred over the inductive coupling between the primary and secondary coils. As such the invention in accordance with the invention provides a cable reel assembly capable of effective storage of the cable, as well as including a solution for charging operation by the use of inductive charging principles. The invention display features for making the solution portable. The cable reel assembly may be arranged portable as a whole or part of the cable reel assembly for instance the cable reel with the primary module may be arranged portable. In the latter case the cable reel may be releasably attached in the cable reel assembly. The cable reel may also be arranged releasably attached in the cable reel assembly, even if the cable reel assembly is not portable.

The cable reel assembly offers a flexible solution where the energy transfer is dependent on connection to the power grid/AC mains supply, but independent on the location of a preinstalled inductive energy transfer point or the location of the power cable, as both equipment for inductive energy transfer and a power cable is integrated as part of the cable reel assembly.

The primary side module and the secondary side module may be arranged rotary relative each other. The cable reel may be arranged rotary relative the secondary side module. As the primary side module is accommodated in the cable reel, the primary side module then rotates along with the cable reel while the secondary side module is arranged stationary and as such the need for slip rings are not necessary. In one aspect the secondary side module may be arranged rotary for instance to follow the movements of the primary side module. Both modules may then be arranged to follow the rotary movements of the cable reel.

The cable reel may be arranged for selective retraction or feed out of the power cable. This ensures a safe storage of the power cable while at same time making the power cable ready to use when needed, for instance simply by pulling the end of the power cable unwinding the cable from the cable reel.

The rotary function of the cable reel may be achieved by a cable reel shaft carrying the cable reel, wherein the cable reel is rotary mounted on the cable reel shaft. The cable reel shaft may be attached in a fixed manner to a support structure or housed inside a cover structure which may comprise a first cover part and a second cover part. The support structure may of course also be provided as a cover structure provided as separate cover parts or as one piece entity. As the skilled person will understand the cable reel may also be fixed to the cable reel shaft which again is rotary mounted to a support structure or other suitable ways which provides for rotation of the cable reel.

For feeding out and retrieving the cable safely on the cable reel a control device may be provided for controlling the rotation of the cable reel relative the cable reel shaft. The control device may be a spring device for instance a coil strip spring or a spring disc. In one aspect the cable reel is provided so that the power cable is fed out simply by pulling the power cable end until the requested cable length is achieved. For the later wound up of the fed out power cable end, an extra pull to the cable end causes the retraction of the power cable by winding the cable length onto the cable reel.

The cable reel shaft may be arranged extending through an interior chamber of the cable reel as defined by inner surfaces of the cable reel. The control device may then be arranged in the interior chamber and may for instance be shaped as a coil strip spring or a disc spring having an inner portion connected to the cable reel shaft and an outer circumferential portion selectively in engagement with the inner surfaces of the cable reel. Alternatively the control device when provided as a spring device may be located at an exterior side face of the cable reel.

The cable reel assembly may be provided with a primary side housing arranged to provide a sealed accommodation space for the primary side module. In a further aspect the primary side housing is provided as a galvanic enclosure or barrier arranged for electric insulation and for preventing intrusion of moisture into the primary side housing.

This same arrangement is also possible for the housing of the secondary side module. The cable reel assembly may comprise a secondary side housing arranged to provide a sealed accommodation space for the secondary side module. In a further aspect the secondary side housing is provided as a galvanic enclosure or barrier arranged for electric insulation and for preventing intrusion of moisture into the secondary side housing.

The primary and /or secondary side housing may be provided completely water tight and is as such capable of enduring withstanding subsea use or in wet environments without the risk of water intrusion into the housing(s). The housings may of course also be provided with a different variation of water resistance depending on the chosen field of use.

It is also possible to provide the cable reel assembly with an additional cable reel for instance if a cable is requested on the secondary side. This may be the case when for instance the secondary side is part of a portable charger with a power cable with a plug to be connected to a socket of an electrical device. The additional cable reel may be configured for accommodation of the secondary side module. When the primary side module is arranged in the cable reel and the secondary side module is arranged in the additional cable reel, the primary side module and the secondary side module may be arranged rotary relative each other. In an alternative use the additional cable reel with the secondary side module may be used independent of the cable reel with the primary side module, and as such may find an application as an independent cable reel with a secondary side module for interaction and inductive transfer of energy with a primary side module which is not necessarily part of a cable reel.

As mentioned previously the cover structure may be provided as a one-piece unit or may be separated into first cover part and second cover part. The cover structure may be provided for protection of the cable reel assembly against unintentional interference from humans or objects and to ensure a dust-free and protected environment for the cable reel assembly. The first cover part may be prepared for housing the cable reel with the primary side module and the secondary side housing may be arranged in the second cover part. When the cover structure is a one-piece unit, the secondary side housing may be provided as an integral part of the cover structure.

By this combination of the functional features where the inductive principles for energy transfer are integrated in a cable reel assembly the solution provides for a versatile entity that may be employed on various electrically operated apparatuses for instance an electrical bicycle or battery operated tools. The cable reel assembly may be arranged portable or may be provided as a permanent installation and may for instance be installed fixed to the bicycle frame. Alternatively the cable reel assembly may be releasably attached to the bicycle frame or other part of the bicycle. As such in one aspect the invention also comprises an electrical bicycle comprising the inventive cable reel assembly.

In one aspect the portable features of the cable reel assembly makes it possible to implement the solution into a cycle stand for carrying out charging operations. The second coil may then be located on the bicycle and provided for connection to the battery, while the reel cable with the primary coil (and the necessary control of the inductive transfer) is located at the cycle stand. The charging operation occurs when the bicycle is placed in the cycle stand at a dedicated location where the primary and secondary coil is positioned to obtain the operative connection. This arrangement may be provided as permanent installation, or the cable reel with the primary coil may be released for a more temporary installation at the cycle stand or for other applications. Alternatively the cable reel assembly may be placed in a position released from the bicycle temporary or permanently, and attached to a bike stand, a wall or other suitable place for the charging to take place. Further suitable places of use may include on board a vessel/boat or other demanding environments such as various industrial use.

Further the cable reel assembly may also be suitable for use with an electrical tool. The features of the cable reel assembly may be integrated into the electrical tool or the cable reel assembly may be applied for inductive transfer of energy to the electrical tool. The secondary coil may be stationary mounted at the electrical tool and the cable reel is arranged to position the primary coil relative to the secondary coil in the operative connection to form an inductive coupling for transfer of energy from the primary coil to the secondary coil in order to conduct a charging operation.

The primary side module and the secondary side module may be separated and the primary side module may be provided as an inductive battery. The primary side module may then be provided as an adapter for wireless power transmission to various secondary side modules.

The cable reel assembly may be arranged integrated as part of a battery packet for use in various applications such as with a tool or on an electrical bicycle. In the latter case the battery packet may be arranged in releasable attachment to the bicycle, and when the battery needs charging the battery packet including the cable reel assembly is released from the bicycle and brought to the charging point, for instance indoors. The wireless power transmission unit of the cable reel assembly may be a custom made unit or a standardized solutions for wireless transmission such as Qi. By using a standardized wireless power transmission solution for the cable reel unit it can be used as a adapter/charger for equipment that have a standardized secondary side wireless power transmission solution. These and other characteristics of the invention will be clear from the following description of an exemplary embodiment, given as a non-restrictive example, with reference to the attached drawings.

Figure 1A:
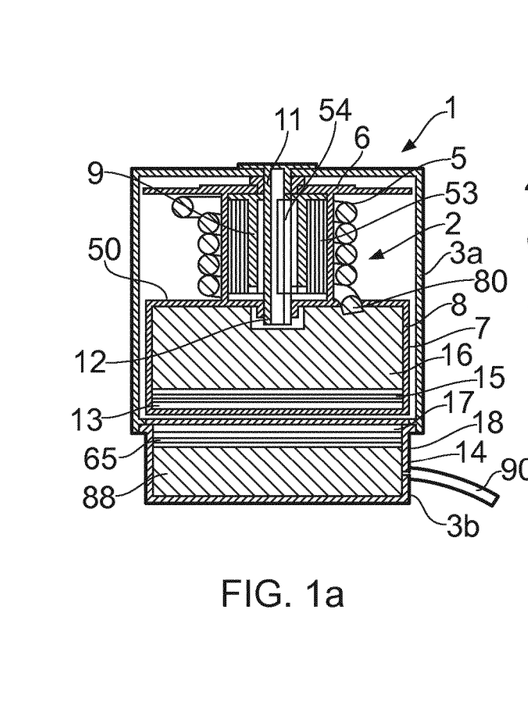
FIG. 1a is a schematic cross sectional illustration of an embodiment of a cable reel assembly.

FIG. 1 shows an example of a cable reel assembly 1 here shown with a cable reel 2 positioned inside a first cover part 3a. The cable reel 2 accommodates a primary side module 8 located at an end portion of the cable reel 2. A power cable 4 is shown wound up on the outer surface of a cylindrical shaped structure 5 of the cable reel 2. The wound up power cable 4 rests on a top surface 50 of the primary side module 8. The enlarged end portion structure 6 of the cable reel 2 keeps the stored power cable 4 in place on the cable reel. The enlarged end portion structure 6 and the end portion where the primary side module 8 is located are positioned at opposite ends of the axial length of the cylindrical shaped structure 5. The cable reel assembly is further provided with a primary housing 7 for accommodation of a primary side module 8.

A cable reel shaft 9 is attached to the first cover part 3a at a first end portion 11 and the cable reel is carried by the cable reel shaft 9 in a rotary connection. The cable reel shaft 9 extends through a central portion of the cable reel 2. The first end portion 11 of the cable reel shaft 9 is connected to the cable reel 2 and a second end portion 12 of the cable reel shaft 9 is also connected to the cable reel 2. As illustrated in FIG. 1 the second end portion 12 of the cable reel shaft 9 is connected to the cable reel 2 at the primary side module 8. As such the cable reel shaft 9 is connected to the cable reel 2 both in the areas of the first end portion 11 and the second end portion 12 where the primary side module 8 is located thereby allowing the cable reel 2 to rotate relative to the cable reel shaft 9.

In order to control rotary movement of the cable reel on the cable reel shaft 9 a control device 53 for instance a coil strip spring as illustrated is provided for selectively control the cable reel rotation for retracting the power cable 4 in accordance with need. As shown the control device 53 is provided as a coil strip spring that has an inner portion 54 connected to the cable reel shaft 9 and an outer circumferential portion is arranged for selective engagement with the inner surfaces of the cable reel to control the rotational movement of the cable reel 2. In accordance with the shown example the feed out and retraction of the cable works as follows; the feed out of the power cable is conducted by a manual pull out force such as when a person pulls the power cable to a chosen length for reaching an electrical socket for plug in. By this pull out, the control device 53, namely the coil strip spring is tightened between the cable reel shaft 9 and the engagement with the inner surface of the cable reel. A releasable locking device (not shown) ensures that the power cable is locked in a position with the desired cable length available to the user. Upon release of the locking device the spring is set free and retracts the power cable by rotating the cable reel winding the power cable on to the outer surface of the cable reel. The locking device may be arranged as brake on the power cable or the cable reel. The locking device is activated by a switch or a mechanism deactivating the brake by a sudden pull exerted on the power cable.

The primary side module 8 comprises a primary coil 13, a ferrite structure element 15 and a primary control and processing unit 16 for controlling and regulation of the inductive energy transfer to occur between the primary coil 13 and a secondary coil 17 of the secondary module 14, as will be explained in further details below. As the primary side module 8 is arranged in the primary housing 7 the primary side module 8 of course follows the rotation of the reel cable.

The power cable 4 has one end connected to the primary side module 8 at a connection point 80 while the other end of the power cable 4 is connected to a power source such as for instance the AC mains supply.

The secondary side module 14 comprises the secondary coil 17 and a ferrite structure element 65 and a secondary control and processing unit 88 for controlling and regulation of the inductive energy transfer to occur between the primary coil 13 and a secondary coil 17. The secondary coil 17 is provided for connection to a chargeable device for delivery of the transferred energy for charging purposes A power cable 90 illustrates the possible connection to the chargeable device. The secondary side module 14 is accommodated in a secondary side housing 18, which in FIG. 1 is housed in a second cover part 3b. The cover parts 3a, 3b provide a dust free accommodation and mechanical protection for the primary side module 8 and the secondary side module 14 respectively. In the figures the cover parts are shown as separate parts, but may also in some cases be provided as a one piece unit.

The primary side module 8 and the secondary side module 14 may be accommodated in the primary side housing 7 and the secondary side housing 18 respectively, in a sealed enclosure to provide a galvanic isolation or barrier to ensure an adequate protection for use in a wet environment.

In the cable reel assembly 1 the primary and secondary coil 13, 17 are positioned relative each other to form an operative inductive coupling for transfer of energy from the primary coil to the secondary coil.

Figure 1B:
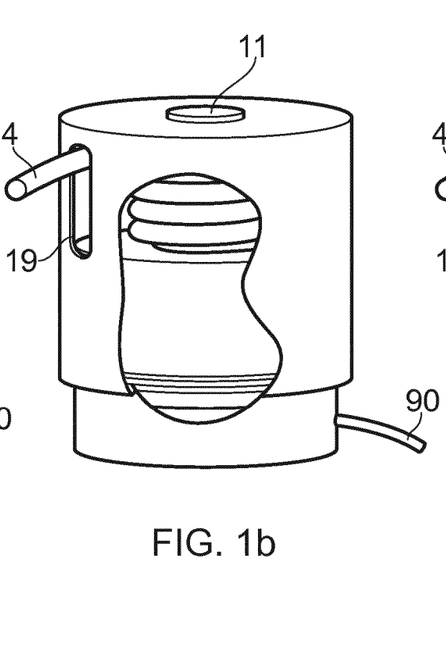
FIG. 1b is a schematic overall illustration of one embodiment of a cable reel assembly showing partly the interior of the cable reel assembly.
Figure 1C:
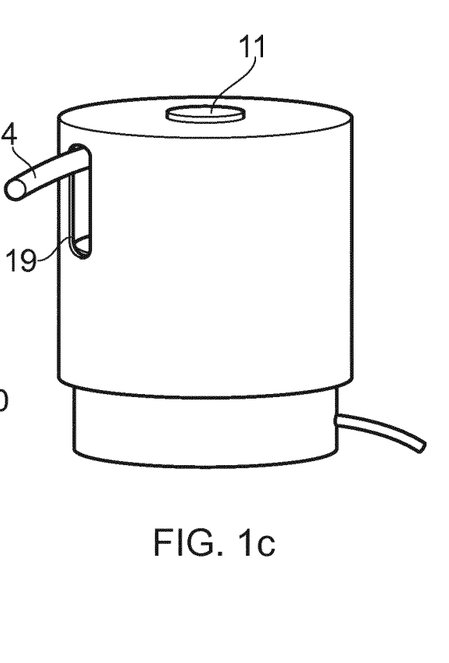
FIG. 1c is a schematic overall illustration of one embodiment of a cable reel in an exterior view.

FIGS. 1b and 1c show the exterior of the first and second cover parts 3a, 3b, where the first cover part 3a is arranged with a cable opening 19 for the power cable 4. The first end portion 11 of the cable reel shaft 9 is also illustrated in these figures.

Figure 2:
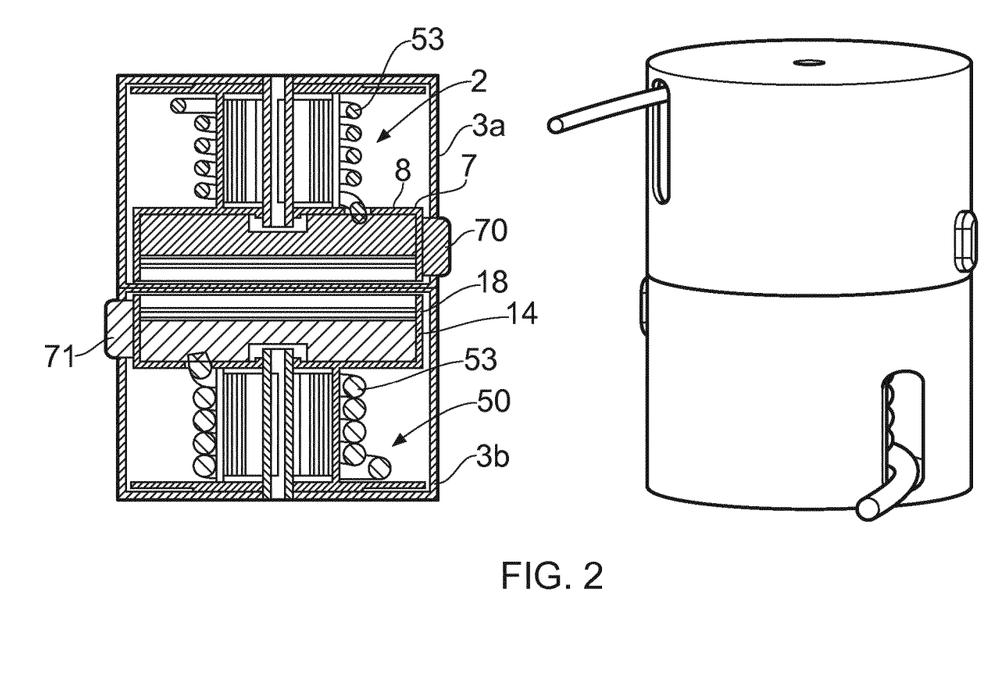
FIG. 2 is a schematic cross sectional illustration of another embodiment of a cable reel assembly.

FIG. 2 shows the primary side housing 7 and the secondary side housing 18 arranged as separate entities to provide a sealed accommodation space for each of the primary side module 8 and the secondary side module 14 respectively. The sealed accommodation may be arranged as a galvanic enclosure or barrier to ensure an adequate protection for use in a wet environment. By the configuration of the primary side housing 7 and the secondary side housing 18 as shown in FIG. 2, these are prepared for separate use. As shown in FIG. 2 an additional cable reel 50 may be configured for accommodation of the secondary side module 14. In accordance with the shown illustration both the second side module 14 and the primary module 8 may be arranged rotary relative each other. The need for an additional cable reel may be present in the case where a cable length is requested for instance for reaching an electrical device at a distance away. Control buttons 70, 71 are provided for pulling in the power cable 4 by the cable reel 2 and by the additional cable reel 50 respectively.

Figure 3A:
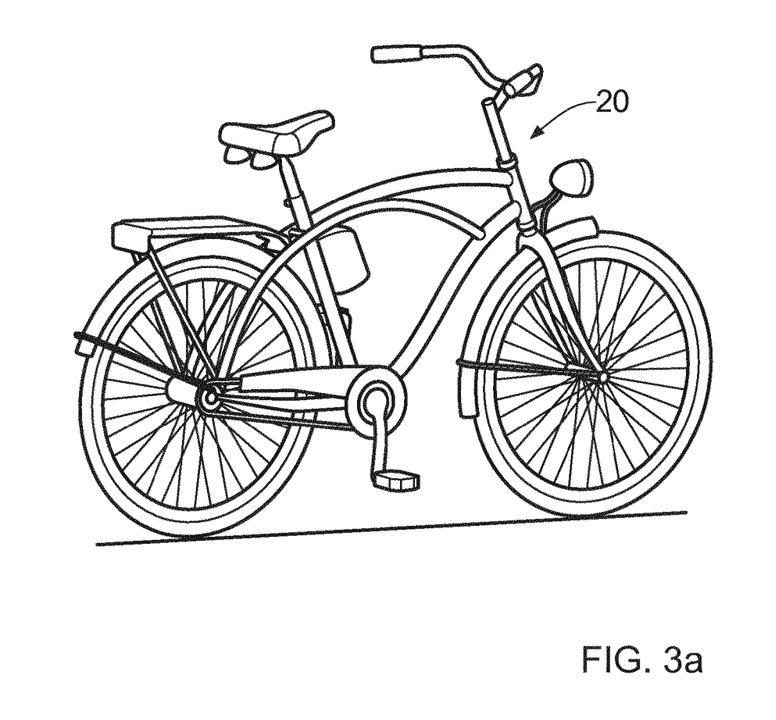
FIGS. 3a and 3b show examples of use of the cable assembly on an electric bicycle.

FIG. 3a shows the cable reel assembly 1 mounted on frame of an electrical bicycle 20. The cable reel assembly 1 may be permanently or releasably attached to the electrical bicycle. A plug 21 is connected to the power cable for connection to a power socket (not shown).

Figure 3B:
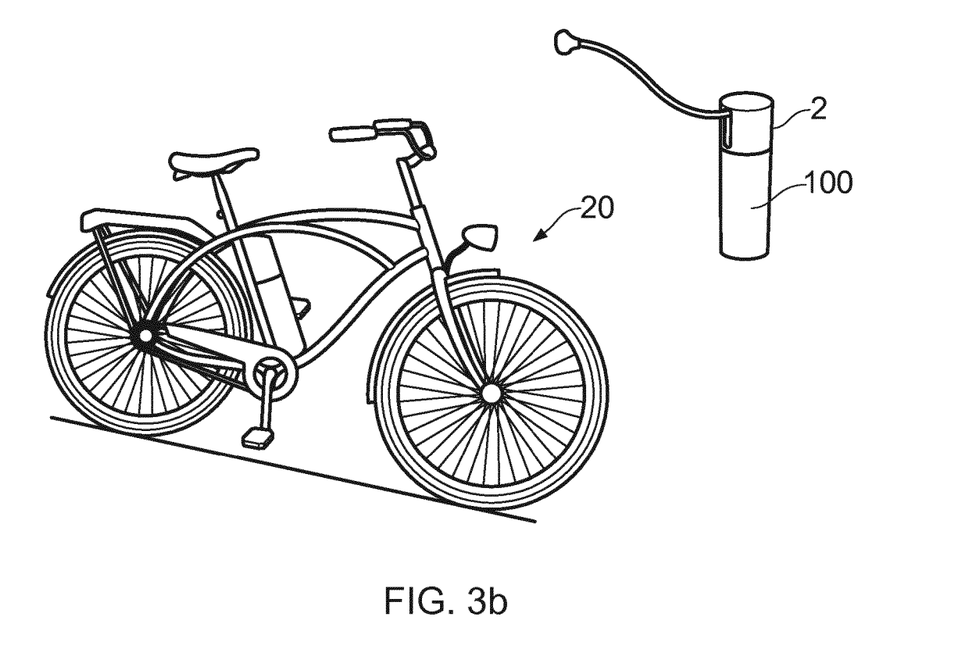

FIG. 3b shows the cable reel assembly 1 included as part of a battery packet 100. The battery packet is shown releasably attached to the bicycle for facilitating charging of the battery when needed. The battery packet 100 with cable reel assembly 1 is released from the bicycle and brought to the charging point, for instance indoors if needed.

Figure 4:
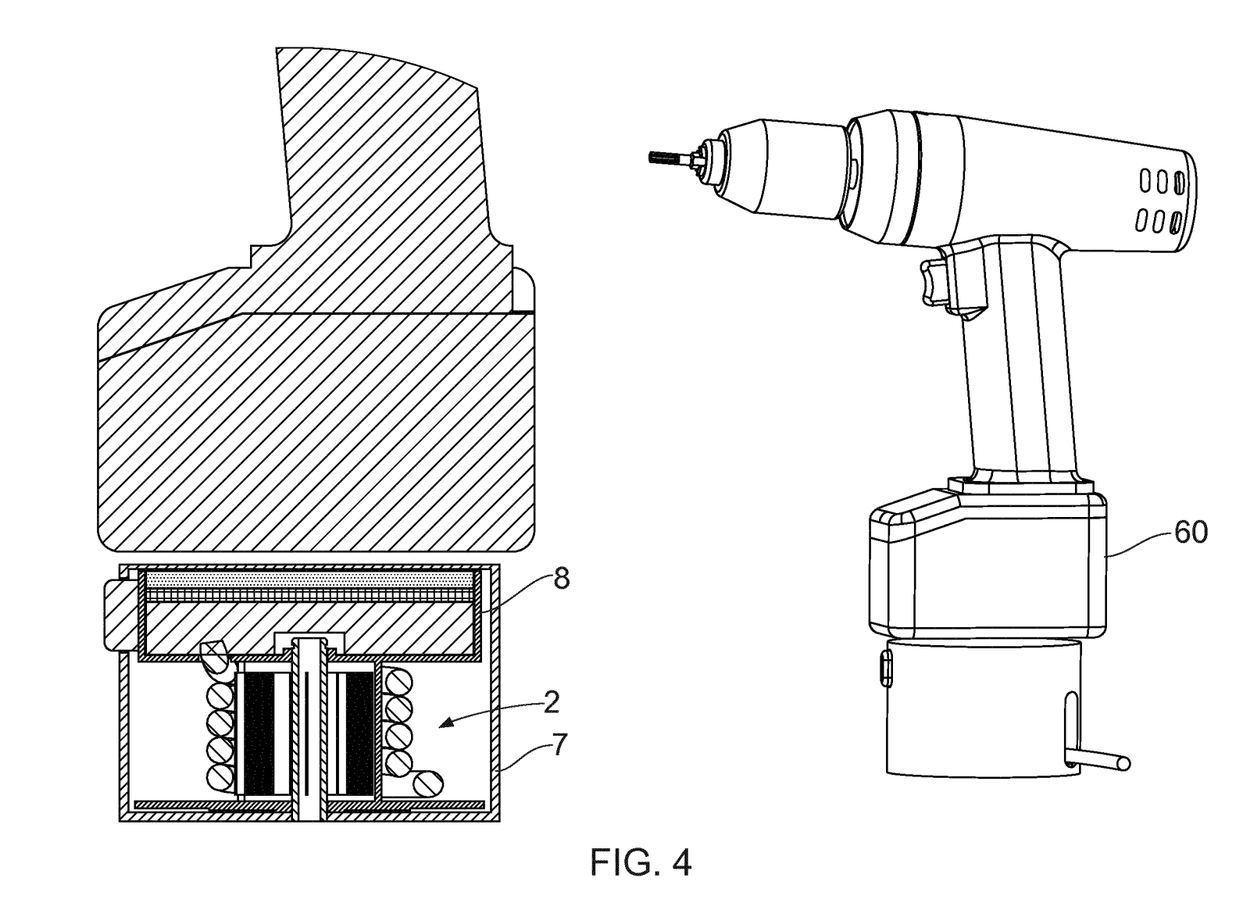
FIG. 4 illustrated the cable assembly implemented in a portable tool

FIG. 4 shows an example of an embodiment where the cable reel 2 accommodating the primary side module 8 functions as an adapter to transfer energy inductively to a secondary side module (not shown) which is integrated in a hand held tool 60. The primary side housing 7 which includes the cable reel 2 and primary side module 8 in the shown example is preferably configured as an enclosure arranged to provide a sealed accommodation space to ensure a galvanic barrier for the cable reel 2 and the the primary side module 8. Alternatively a primary side housing may be provided solely for the primary side module 8 preferably ensuring a galvanic barrier for the primary side housing, while a protective cover structure houses both the primary side housing with the primary side module 8 and the cable reel, similar to the arrangement of FIG. 2. As the skilled person will understand the hand held tool 60 is shown for illustrative purposes, and the cable reel 2 accommodating the primary side module 8 may of course be applied for other electrical devices than the shown tool 60.

Figure 5A:
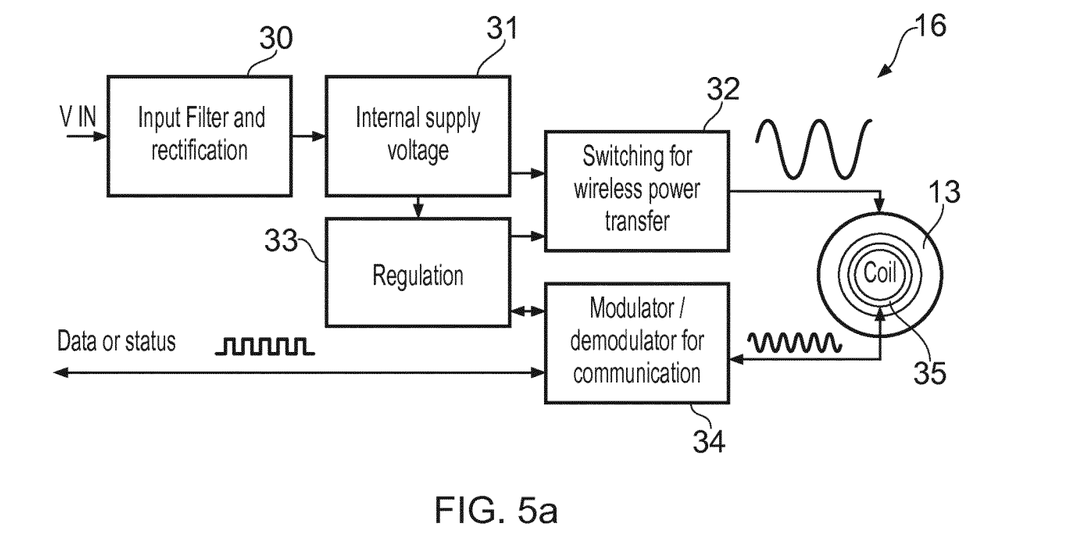
FIG. 5a is a schematic overview of the operation of the primary side module of the power transmission in a cable reel assembly.

FIG. 5a is a schematic overview of the wireless operation of the primary side module of the power transmission in a cable reel assembly presented as a process diagram illustrating the process steps of the primary control and processing unit 16 in the primary side module for controlling and regulation of the inductive energy transfer between the primary coil 13 and the secondary coil 17. The power cable 4 supplies the power input V IN to the primary control and processing unit 16. The input power may be supplied from any source such as mains supply, locally produced voltage, battery, etc., and may be AC or DC voltage. In the primary control and processing unit 16, an initial step 30 comprises the filtration and possible rectifying(in case of AC input voltage) the input voltage. If the input voltage is DC no rectifying is necessary.

The filtrated/rectified voltage is provided as an internal supply voltage as illustrated in process step 31. The internal supply voltage supplies the switching 32, regulation 33 and the modulator/demodulator 34 with individual regulated voltage level. The power is mainly transferred inductively from the primary side module 16 to the secondary side module 14 by means of the power coils 13, 17. The step 32 of switching for wireless power transfer modulates the internal supply voltage with a low frequency, for example in the 10-1000 kHz frequency region for the power transfer. Step 33 illustrates the possibility of regulating the energy transfer, for example based on information received from the secondary side module or predetermined transfer sequences.

The regulation step 33 may also provide regulation or information data signals for the secondary side module. Regulation signals and/or other data may be transferred both ways between the primary and secondary side modules 16, 14 by means of signal coils 35, 38. It is also possible to transfer data by means of the primary and secondary coils (power coils) 13, 17. To transfer data and /or regulation signals, the data signal is modulated in step 34. The modulation frequency of the data signals is preferably higher than the modulation frequency of the power transfer, in order to separate the signals and to achieve a desired bandwidth for the data transfer. The modulation frequency may for example be 1-100 MHz. In some embodiments, it may be desirable to be able to communicate on more than one channel, this can be achieved by using different modulation frequencies for the different communication channels. For example, may status signals be transmitted with one frequency and regulation signals with another frequency.

Step 34 comprises also a demodulator to enable two-way communication in the system.

Figure 5B:
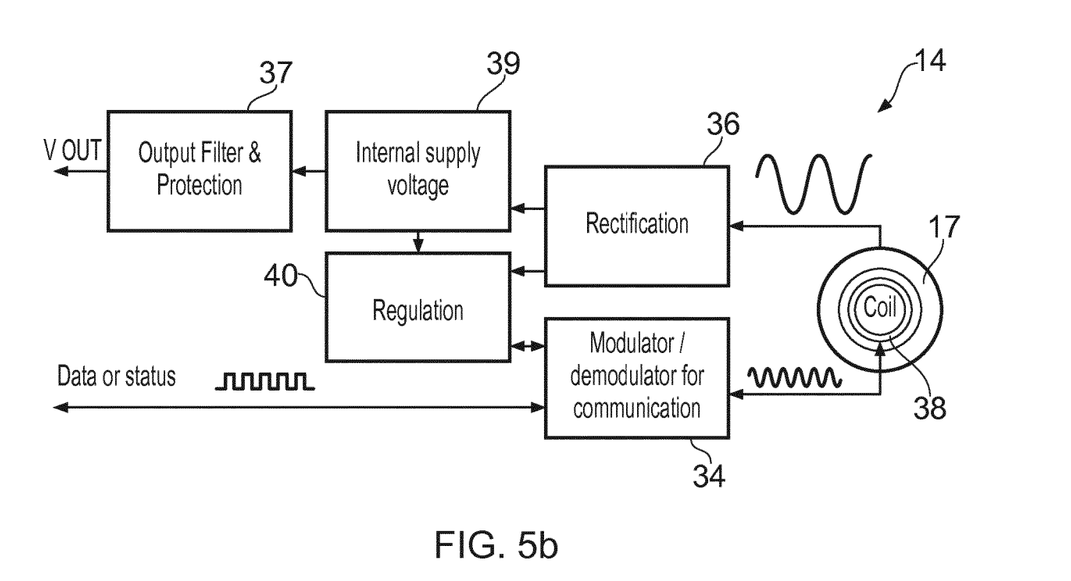
FIG. 5b is a schematic overview of the operation of the primary side module and the secondary side module of the power transmission in a cable reel assembly.

In the secondary side module 14, both the energy and any data signals are received. This process is illustrated in FIG. 5b and will be described below. The secondary side module 14 may also comprise one or several sensors, for example for measuring current, voltage, polarity, temperature or other features important for the electrical device or tool. The signals representing the information from the sensors may then be transmitted to the primary side module and used in step 33 for regulating and controlling the power transfer, and/or for monitoring the energy transfer process.

The modulated energy received from the primary side module by the power coil 17, is rectified in step 36, filtered in step 37, and is then output as a DC voltage ready to be utilized by the electrical device or tool. The electrical device may for example be a battery, in which case the regulation step 33 may comprise an algorithm suitable for charging a battery. This algorithm, and other regulating algorithms for regulating energy transfer adapted to the relevant electrical device, may use data from sensors as described above. The internal supply voltage of step 39, which is now rectified and thus DC voltage, deliver voltages to regulator 40 and modulator/demodulator 34. To transfer data and /or regulation signals, the data signal is modulated in step 34. The data signals transferred from the secondary side module to the primary side module may be used for controlling the power transfer as described above.

The invention claimed is:

1. Cable reel assembly for inductive transfer of energy to an electrical device, the cable reel assembly comprising:
    a cable reel having an outer surface provided for the storage of a power cable, the cable reel is configured for accommodation of a primary side module comprising a primary coil provided for connection to the power cable,
    a secondary side module comprising a secondary coil provided for connection to the electrical device,
    control and communication means for communication between the primary side module and secondary side module and controlling the transfer of energy based on signals representing information about the status of the electrical device, wherein
    the control and communication means comprises a primary signal coil and a secondary signal coil arranged in an operative position to form an inductive coupling for transfer of the signals,
    the primary and secondary coil are arranged in an operative position to form an inductive coupling for transfer of energy from the primary coil to the secondary coil.

2. Cable reel assembly in accordance with claim 1, wherein the cable reel is arranged rotary relative the secondary side module.

3. Cable reel assembly in accordance with claim 1, wherein a primary side housing is arranged to provide a sealed accommodation space for the primary side module and optionally provides a galvanic enclosure/barrier and electrical insulation.

4. Cable reel assembly in accordance with claim 1, wherein a secondary side housing is arranged to provide a sealed accommodation space for the secondary side module and optionally provides a galvanic enclosure/barrier and electrical insulation.

5. Cable reel assembly in accordance with claim 1, further comprising an additional cable reel configured for accommodation of the secondary side module.

6. An electrical bicycle comprising a cable reel assembly in accordance with claim 1, wherein the cable reel assembly is fixed or releasably arranged to the electrical bicycle.

7. An electrical tool comprising the cable reel assembly in accordance with claim 1, wherein the secondary coil is mounted at the electrical tool and the cable reel is arranged to position the primary coil relative to the secondary coil in the operative connection to form an inductive coupling for transfer of energy from the primary coil to the secondary coil.

8. A battery packet comprising a cable reel assembly in accordance with claim 1, where the cable reel assembly is integrated to form a unit with the battery packet.

9. Cable reel assembly in accordance with claim 1, where the control and communication means comprises a primary control and processing unit and a secondary control and processing unit, wherein the primary control and processing unit is configured to regulate the inductive transfer of energy based on signals representing information about the status of the electrical device as transmitted in communication between the primary control and the secondary control and processing unit.

10. Cable reel assembly in accordance with claim 9, wherein the communication between the primary control and the secondary control processing unit comprises regulation of a charging operation.

11. Cable reel assembly for inductive transfer of energy to an electrical device, the cable reel assembly comprising:
- a cable reel having an outer surface provided for the storage of a power cable, the cable reel is configured for accommodation of a primary side module comprising a primary coil provided for connection to the power cable,
- a secondary side module comprising a secondary coil provided for connection to the electrical device, and
- a controller between the primary side module and secondary side module controlling the transfer of energy based on signals representing information about the status of the electrical device,
- wherein the primary and secondary coil are arranged in an operative position to form an inductive coupling for transfer of energy from the primary coil to the secondary coil and to form an inductive coupling for transfer of signals.

* * * * *